US005770068A

United States Patent [19]

Jepson

[11] Patent Number: 5,770,068

[45] Date of Patent: Jun. 23, 1998

[54] MULTI-PHASE MIXING IN A HYDRAULIC JUMP

[75] Inventor: W. Paul Jepson, Athens, Ohio

[73] Assignee: Ohio University, Athens, Ohio

[21] Appl. No.: 603,130

[22] Filed: Feb. 20, 1996

[51] Int. Cl.[6] ............................ B01D 53/00; B01D 17/12

[52] U.S. Cl. ....................... 210/741; 210/251; 261/119.1; 96/22; 96/151; 366/341; 422/224

[58] Field of Search .................................... 210/741, 808, 210/97, 137, 251, 255; 261/75, 119.1; 96/19, 22, 151; 366/341; 422/224

[56] References Cited

U.S. PATENT DOCUMENTS

| | | | |
|---|---|---|---|
| 3,729,179 | 4/1973 | Keller | 261/114 |
| 3,934,472 | 1/1976 | Bradham | 73/215 |
| 4,097,026 | 6/1978 | Haindl | 366/165 |
| 4,308,138 | 12/1981 | Woltman | 210/220 |
| 4,397,190 | 8/1983 | Hulin | 73/861.04 |
| 4,451,373 | 5/1984 | Thayer | 210/626 |
| 4,904,420 | 2/1990 | Cornelissen | 261/92 |
| 5,044,554 | 9/1991 | Fuller et al. | 239/17 |
| 5,287,752 | 2/1994 | Den Boer | 73/861.04 |
| 5,378,378 | 1/1995 | Meurer | 210/788 |
| 5,514,285 | 5/1996 | Rizk et al. | 210/739 |

FOREIGN PATENT DOCUMENTS

| | | |
|---|---|---|
| 2085897 | 10/1981 | United Kingdom . |
| WO8707886 | 6/1987 | WIPO . |

OTHER PUBLICATIONS

Kouba & Jepson, *Slugs and Hydraulic Jumps in Horizontal Two Phase Pipelines,* 19–21 Jun. 1989, 4th International Conference on Multi–Phase Flow.

W.P. Jepson, *The Flow Characteristics in Horizontal Slug Flow,* 18–20 May, 1987, 3rd International Conference on Multi–Phase Flow, pp. 187–197.

*Primary Examiner*—Thomas G. Wyse

*Attorney, Agent, or Firm*—Killworth, Gottman, Hagan & Schaeff, L.L.P.

[57] ABSTRACT

A stationary hydraulic jump is utilized in a multi-phase mixing system to mix components present in a plurality of separate phases. The flow rate and film height of a liquid phase in a first pipe section is metered and combined with a flow rate metered gas phase to form a stationary hydraulic jump in a second pipe section. The jump position is monitored and maintained stationary. A mixed fluid flows from the jump. A variety of solid, liquid, and gaseous components may be mixed in the hydraulic jump through appropriate selection of the liquid and gas phase components.

35 Claims, 5 Drawing Sheets

MULTI-PHASE MIXING IN A HYDRAULIC JUMP

BACKGROUND OF THE INVENTION

The present invention relates to multi-phase mixing and, more particularly, to the use of a stationary hydraulic jump for mixing the components of a liquid with the components of a gas. The present invention is useful both in processes where materials are physically mixed as well as where a material is transferred from one phase to another through mass transfer and/or where a chemical reaction occurs during mixing. References to mixing in this specification should be taken to include those operations where physical mixing, mass transfer, and/or a chemical reaction occurs.

Multi-phase mixing is employed in a variety of applications. For example, particulate matter is mixed with a solvent to dissolve the particles in the solvent; particulate matter is mixed with a fluid to suspend the particles in the fluid; and, a gas and liquid are mixed to react the gas and liquid, to react components suspended or dissolved in the gas or liquid, or to treat a component of one with a component of the other.

Multi-phase mixing processes are limited by the speed and efficiency of the particular mechanical structures which blend the components of different phases. As a result, long residence times within the particular mixer are often required. Further, many multi-phase mixing processes involve the use of noxious components. Additional structure must be provided to prevent release of these components into the environment if the mixer itself is not equipped to prevent their release. Many multi-phase mixing systems also include moving parts which malfunction after prolonged use and exposure to the components of a mixture.

Accordingly, there is a need for a multi-phase mixing system which efficiently and quickly blends components, prevents release of noxious mixing components into the environment, and utilizes a minimum of moving parts in the mixing process. The present invention utilizes stationary hydraulic jump technology to meet these needs.

Stationary hydraulic jumps had previously been studied to gain a greater understanding of slug flow within pipelines. As described in U.S. Pat. No. 5,232,475, the disclosure of which is incorporated herein by reference, slugs are fluid bodies which fill the cross section of a liquid/gas pipeline. Individual slugs flow within the pipeline at a much higher flow rate than the liquid carried within the pipeline. As a result, the piping and related equipment downstream of the slugs experience intermittent surges and subsequent impact from the flowing slugs.

In an effort to eliminate slug flow within pipelines, open and closed channel stationary hydraulic jumps have been the subject of diagnostic examination. For example, Jepson and Kouba have studied slug flow characteristics by creating a stationary hydraulic jump ("The Flow Characteristics in Horizontal Slug Flow," 3rd International Conference on Multi-Phase Flow, May, 1987; "Slugs and Hydraulic Jumps in Horizontal Two Phase Pipelines," 4th International Conference on Multi-Phase Flow, June, 1989.) The fixed frame of reference provided by the stationary hydraulic jump facilitates an improved analysis of the flow characteristics of a slug. Prior to the present invention, however, stationary hydraulic jumps had not been utilized to fill the above described need for improved multi-phase mixing systems.

SUMMARY OF THE INVENTION

The present invention provides a stationary hydraulic jump which is utilized in a multi-phase mixing system to efficiently, ecologically, and reliably mix components present in a plurality of separate phases.

In accordance with one aspect of the present invention, a method of mixing materials is provided comprising the steps of providing a first inlet flow of a first fluid in a first pipe section, providing a second inlet flow of a non-atmospheric second fluid in the first pipe section, creating at least one stationary hydraulic jump in a second pipe section in communication with the first pipe section, mixing the first fluid and the second fluid in the at least one stationary hydraulic jump, and providing a mixed fluid flow in a third pipe section. The term "non-atmospheric fluid," as used in the present specification and claims, denotes any gas, gas mixture, gas-liquid mixture, and any gas-particulate mixture, substantially different than the mixture of components commonly present in air. Examples include but are not limited to: hydrogen; nitrogen; carbon; oxygen; helium; gaseous mixtures; air mixed with another gas; and air mixed with particulate matter, such as for example effluent from a smoke stack or volcano.

The first fluid comprises a liquid and the second fluid comprises a gas. The method may further comprise the steps of monitoring pressure values within a monitoring pipe section at a plurality of points along the monitoring pipe section, and controlling the at least one stationary hydraulic jump in response to the monitored pressure values.

The controlling step preferably comprises maintaining constant a back pressure applied to the mixed fluid flow when the monitoring step indicates a first pressure distribution along the monitoring section, and altering the back pressure when the monitoring step indicates a second pressure distribution different than the first pressure distribution along the monitoring section. The controlling step may also comprise maintaining constant a flow rate of the first fluid, a flow rate of the second fluid, and a back pressure applied to the mixed fluid flow, when the monitoring step indicates a first pressure distribution along the monitoring section, and altering at least one of the first fluid flow rate, the second fluid flow rate, and the back pressure when the monitoring step indicates a second pressure distribution different than the first pressure distribution along the monitoring section. It is also possible, but not preferred, to control the jump based upon a single pressure measurement, wherein one pressure value corresponding to one point along a monitoring pipe section is monitored and wherein the back pressure is altered when the monitoring step indicates movement of the hydraulic jump.

In horizontal configurations, a single jump may be created, the first pressure distribution may include a relatively high pressure region substantially at a jump portion of the monitoring section and a relatively low pressure region in a remainder of the monitoring section, and the second pressure distribution may include a relatively high pressure region substantially removed from the jump portion of the monitoring section and a relatively low pressure region in a remainder of the monitoring section. If the system is inclined upwards, a plurality of jumps may be created, the first pressure distribution may include relatively high pressure regions located substantially symmetrically with respect to the midpoint of a plurality of jump portions of the monitoring section and relatively low pressure regions in a remainder of the monitoring section, and the second pressure distribution may include relatively high pressure regions substantially removed from the substantially symmetrical locations and relatively low pressure regions in a remainder of the monitoring section.

The controlling step may comprise controlling one of a flow rate of the first fluid, a flow rate of the second fluid, and a back pressure applied to the mixed fluid flow. Further, the controlling step may comprise controlling the position of the at least one stationary hydraulic jump in the monitoring pipe section or controlling the strength of the at least one stationary hydraulic jump in the monitoring pipe section.

The creating step may comprise selecting a film height and a flow rate of the first fluid, selecting a flow rate of the second fluid, and applying a back pressure to the mixed fluid flow. The back pressure is applied in a direction opposite a direction of the mixed fluid flow. An increase in back pressure moves the at least one stationary hydraulic jump in an upstream direction, and a decrease in back pressure moves the at least one stationary hydraulic jump in a downstream direction.

The creating step may comprise selecting a desired mixing intensity and controlling one of a film height and a flow velocity of the first fluid corresponding to the selected intensity. The selected mixing intensity is characterized by a Froude number of preferably between about 1 and about 14, and most preferably between about 4 and about 12.

The first pipe section is at a first pressure and the second fluid is introduced into the second inlet at a same or similar pressure.

One of the first and second fluids may contain a contaminant while the other of the first and second fluids contains a contaminant removal component which, through mass transfer, removes the contaminant from one of the fluid phases, and/or through a chemical reaction removes or destroys the contaminant. The removal component may be selected from the group consisting of an absorbent liquid, a leaching gas, an emulsifying agent, and combinations thereof.

One of the first and second fluids may contain a component which dissolves in a component of the other of the first and second fluids after the mixing step. One of the first and second fluids may contain a component which is suspended in the other of the first and second fluids after the mixing step. One of the first and second fluids may comprise a contaminant and the other of the first and second fluids may comprise an agent for treating the contaminant. One of the first and second fluids may contain a component which reacts with a component of the other of the first and second fluids. The first fluid may comprise a liquid and a substantial portion of particulate matter, while the second fluid comprises a gas. The first fluid may comprise a liquid and a substantial portion of a gas, while the second fluid comprises a gas. The first fluid may comprise a liquid, while the second fluid comprises a gas and a substantial portion of particulate matter. The first fluid may comprise a liquid, while the second comprises a gas mixed with a substantial portion of a liquid. Finally, at least one of the first and second fluids may comprise a three phase mixture of components.

The method may further comprise a step of separating at least two components of the mixed fluid flow.

In accordance with another aspect of the present invention, a method of mixing materials is provided comprising the steps of providing a first inlet flow of a first fluid in a first pipe section, providing a second inlet flow of a second fluid in the first pipe section, creating at least one stationary hydraulic jump in a second pipe section in communication with the first pipe section, mixing the first fluid and the second fluid in the at least one stationary hydraulic jump, providing a mixed fluid flow in a third pipe section, monitoring pressure values within a monitoring pipe section at a plurality of points along the monitoring pipe section, and controlling the at least one stationary hydraulic jump in response to the monitored pressure values.

In accordance with yet another aspect of the present invention, an apparatus is provided for mixing materials comprising: a first pipe section including a first fluid inlet, a second non-atmospheric fluid inlet, and a first fluid film height controller; a second stationary hydraulic jump pipe section in communication with the first pipe section; and, a third pipe section, in communication with the second pipe section, including a back pressure regulator.

The apparatus may further comprise a pipe pressure distribution sensor adapted to sense the pressure distribution along a monitoring pipe section, a controller adapted to control the back pressure regulator in response to the sensed pressure distribution, or a controller adapted to control the back pressure regulator, the film height controller, and a first fluid flow rate controller, in response to a sensed pressure distribution.

The second pipe section may be inclined with respect to a flow direction of the first fluid and the second fluid inlet may comprise a plurality of fluid inlet ports located so as to be positioned prior to a first stationary hydraulic jump and between successive stationary hydraulic jumps in the second pipe section. In which case, the second pipe section may be inclined at an angle of about 3 degrees or less from the horizontal plane. The second pipe section may include a plurality of pipes each including a section carrying at least one stationary hydraulic jump, and the plurality of pipes may communicate with a common fluid header.

The apparatus may further comprise a mixed fluid separator. The first, second and third pipe sections may have pipe diameters of about 10 cm.

Accordingly, it is a feature of the present invention to provide a high speed, high efficiency, environmentally and mechanically sound multi-phase mixing system. It is a further feature of the present invention to provide a mixing system with automatically and readily controllable mixing parameters. These and other features and advantages of the present invention will be apparent from the following description, the accompanying drawings, and the appended claims.

DETAILED DESCRIPTION OF THE PREFERRED EMBODIMENTS

Figure 1:
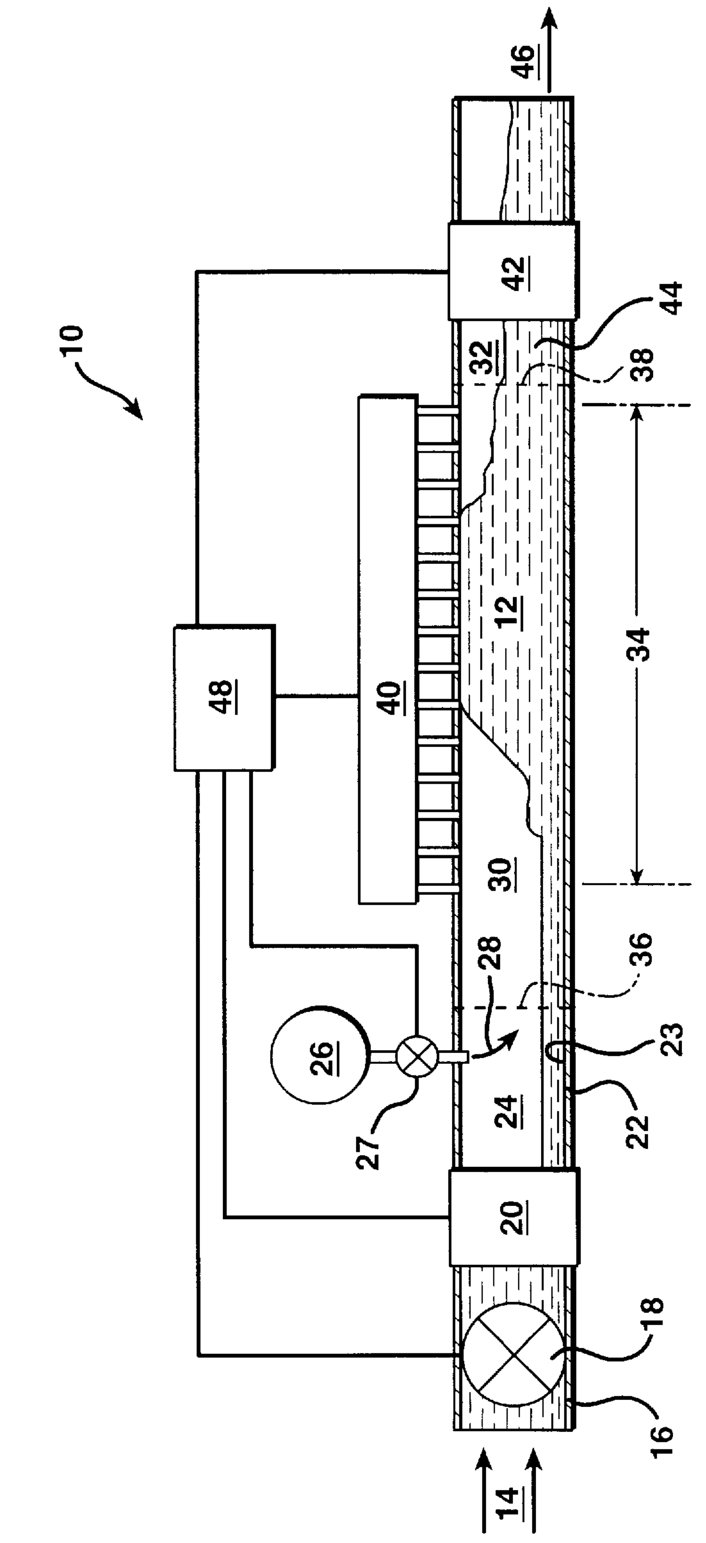
FIG. 1 is a schematic illustration of a multi-phase mixing system according to a first embodiment of the present invention.

FIG. 1 illustrates a mixing system 10 for mixing a gas and a liquid in a stationary hydraulic jump 12 in accordance with the present invention. An input liquid flow 14 in an input pipe 16 is metered by a first flow rate controller 18 and a film height controller 20. As a result of this metering, a first inlet flow of liquid 22 having a predetermined film height and flow rate is provided in a first pipe section 24. The film height, or fluid thickness, is defined as the cross sectional area of a liquid flow divided by the width of the liquid flow at a gas/liquid interface 23. The film height controller 20 is any fluid flow metering device which produces a fluid film having a preselected thickness or fluid height in the first pipe section 24. For example, the film height controller may be a flow obstructing gate positioned in the fluid path in the input pipe 16. Such a gate is constructed so as to pass a preselected fluid thickness between the bottom of the gate and the bottom of the input pipe 16. The height of the gate may be adjustable so as to enable variable selection of an appropriate film height, or may be fixed, i.e., in the form of an orifice plate positioned in the flow path.

A non-atmospheric gas source 26 and a second flow rate controller 27 are coupled to the first pipe section 24 to provide an inlet flow 28 of a non-atmospheric gas in the first pipe section 24. The terms "non-atmospheric gas" and "non-atmospheric fluid," as used in the present specification and claims, denote any gas, gas mixture, gas-liquid mixture, and any gas-particulate mixture, substantially different than the mixture of components commonly present in air. Examples include but are not limited to: hydrogen; nitrogen; carbon; oxygen; helium; gaseous mixtures; air mixed with another gas; and air mixed with particulate matter, such as for example effluent from a smoke stack or volcano. It is contemplated by the present invention that a component of a third phase, e.g., solid particles, can be introduced into either the gas, the liquid, or the gas and liquid phases of the embodiment illustrated in FIG. 1. The term "fluid" as used in the present specification and claims, denotes any gas, gas mixture, gas-liquid mixture, gas-particulate mixture, liquid mixture, and any liquid-particulate mixture characterized by low resistance to flow and the tendency to conform to the shape of a container.

For the purpose of describing the present invention, the pipe utilized by the system is described as having first 24, second 30, and third 32 pipe sections with boundaries indicated by dashed lines 36 and 38. Further, a monitoring pipe section 34 is indicated as occupying a portion of the second section 30. The monitoring pipe section 34 is defined by that pipe region subject to pressure monitoring by a pressure distribution sensor 40. It is contemplated by the present invention that the monitoring section 34 may occupy a portion of any one or all of the first, second, and third pipe sections 24, 30, 32. Further, a plurality of spaced monitoring sections may be arranged in any of the pipe sections so long as an indication of jump location is obtainable from the measured pressure values.

A back pressure regulator 42 is located in the third pipe section 32 and functions to apply pressure in an upstream direction to a mixed fluid flow 44. The back pressure regulator 42 is typically a fluid flow control valve, a variable height fluid flow obstructing gate, or any flow restrictive device which applies an upstream pressure to the mixed fluid flow 44.

The inlet liquid flow 22, the inlet gas flow 28, and the back pressure regulator 42 combine to form the stationary hydraulic jump 12. The jump 12 comprises a turbulent mixture of the liquid phase introduced in the inlet liquid flow 22 and the gas phase introduced in the inlet gas flow 28. The multiphase mixture so formed is output as a mixed phase fluid 46. The first flow rate controller 18, the film height controller 20, the second flow rate controller 27, and the back pressure regulator 42 are each subject to control by a controller 48 which operates to monitor and control the position and intensity of the jump 12. It should be noted, however, that if the film height controller 20 is a fixed-height orifice plate, the film height controller will not be subject to control by the controller 48.

The position of the stationary jump 12 is monitored by measuring pressure values at a plurality of points within the monitoring pipe section 34 with the pressure distribution sensor 40. These measured pressure values define a pressure distribution along the monitoring section 34. The pressure distribution is input to the controller 48 and includes a jump portion defined by a relatively high pressure region corresponding to the jump 12 and a remaining portion defined by a relatively low pressure region corresponding to fluid flow outside the bounds of the jump 12. A change of location of the relatively high pressure region within the pressure distribution indicates movement of the jump 12 within the monitoring section 34. If movement of the jump is indicated, the controller responds by changing the back pressure applied by back pressure regulator 42, the flow rate imparted to the inlet liquid flow 22 by the first flow rate controller 18, and/or the flow rate imparted to the inlet gas flow 28 by the second flow rate controller 27. Regulation of the back pressure is the preferred manner of controlling the position of the jump 12. Specifically, an increase in back pressure will reduce movement of the jump in the downstream direction and a decrease in back pressure will reduce movement of the jump in the upstream direction. Similarly, an increase in liquid or gas flow rate will reduce movement of the jump in the upstream direction and a decrease in liquid or gas flow rate will reduce movement of the jump in the downstream direction. Thus, since the location and orientation of the pressure measurement points along the monitoring section are known, the direction of jump movement can be determined from the pressure distribution and controlled by varying the back pressure and the fluid flow rates as described above.

It is contemplated by the present invention, that the pressure distribution sensor may be replaced by a pressure sensor which measures one or two pressure values corresponding to one or two points along a monitoring pipe section, as opposed to a complete pressure distribution. The back pressure is altered when the pressure measurements indicate movement of the hydraulic jump. For example, a substantial change in pressure at one or both of the sensors would indicate movement of the jump.

If no movement of the jump is indicated, alteration of the back pressure and/or flow rates is not necessary. It should be noted, however, that the back pressure and the flow rates may be changed to alter the mixing intensity of the jump 12, even if the jump is stationary.

The intensity of the stationary jump 12 may be characterized by a dimensionless Froude number, Fr, and is defined by the following equation:

$$Fr=V_f/\sqrt{(g*h)} \quad \text{(equation 1)}$$

where $V_f$ is the average velocity of the inlet liquid flow 22, g is the component of acceleration due to gravity in a direction perpendicular to the fluid flow, and h is the film height of the inlet defined as the cross sectional area of the liquid flow 22 divided by the width of the liquid flow 22. Thus, to change the intensity of the jump, the film height and/or the inlet liquid velocity must be changed.

To maintain a stationary jump while changing the intensity, the back pressure regulator must be controlled in accordance with the pressure distribution sensed along the monitoring section 34, as described above. Specifically, the back pressure must be changed to a value which stabilizes the position of the relatively high pressure region in the monitoring section.

Selected preferred mixing intensities are characterized by Froude numbers (Fr) between about 1 and about 14. Minimal mixing occurs in a jump characterized by a Froude number of 1. A jump characterized by a Froude number of 4 demonstrates moderate mixing. Strong jumps are characterized by Froude numbers ranging from 12 to 14. Selection of mixing intensity is guided by the type of mixing to be done as well as by the properties of the components to be mixed. For example, if a biological agent present in one of the phases is subject to degradation at high mixing intensities, it will be necessary to select a mixing intensity low enough to avoid degradation, e.g. Fr=1 or Fr=4.

Preferred liquid and gas flow velocities range from about 0.5 to 1.5 m/sec within a pipe diameter of about 10 cm (4 inches). Preferred film heights occupy from about 25% to about 35% of the pipe diameter. It should be noted, however, that a wide range of flow velocities and film heights may be utilized. Indeed, the flow velocities and film heights are limited only by the selected jump intensity defined above (see equation 1). Once the flow velocity and fluid height have been selected, the back pressure is adjusted to a value which will yield a stationary jump. The pressure drop created across the back pressure regulator is typically near about 0.1 to about 0.5 psig (0.689 to 3.45 kPa). In the event a variable height fluid flow obstructing gate is used as the back pressure regulator 42, an appropriate back pressure will often be achieved by blocking 5% to 20% of the pipe diameter with the gate. It should, however be noted that a variety of back pressure values can be used to achieve a stationary jump according to the present invention because the appropriate back pressure value is dependent on a variety of system variables, e.g., fluid properties, pipe diameter, fluid flow rates, film height, system pressures, etc.

The system illustrated in FIG. 1 may be operated at a range of pressures. The gas and liquid inlet pressures are preferrably substantially the same. The nature of the invention is such that a wide range of operating pressures may be utilized as long as the gas source pressure is higher than the pressure of the first pipe section 24 in order to facilitate entry of the gas into the first pipe section 24.

It is contemplated by the present invention that the stationary hydraulic jump position and intensity control of the FIG. 1 system may be provided in any of the stationary hydraulic jump mixing systems described herein.

Figure 2:
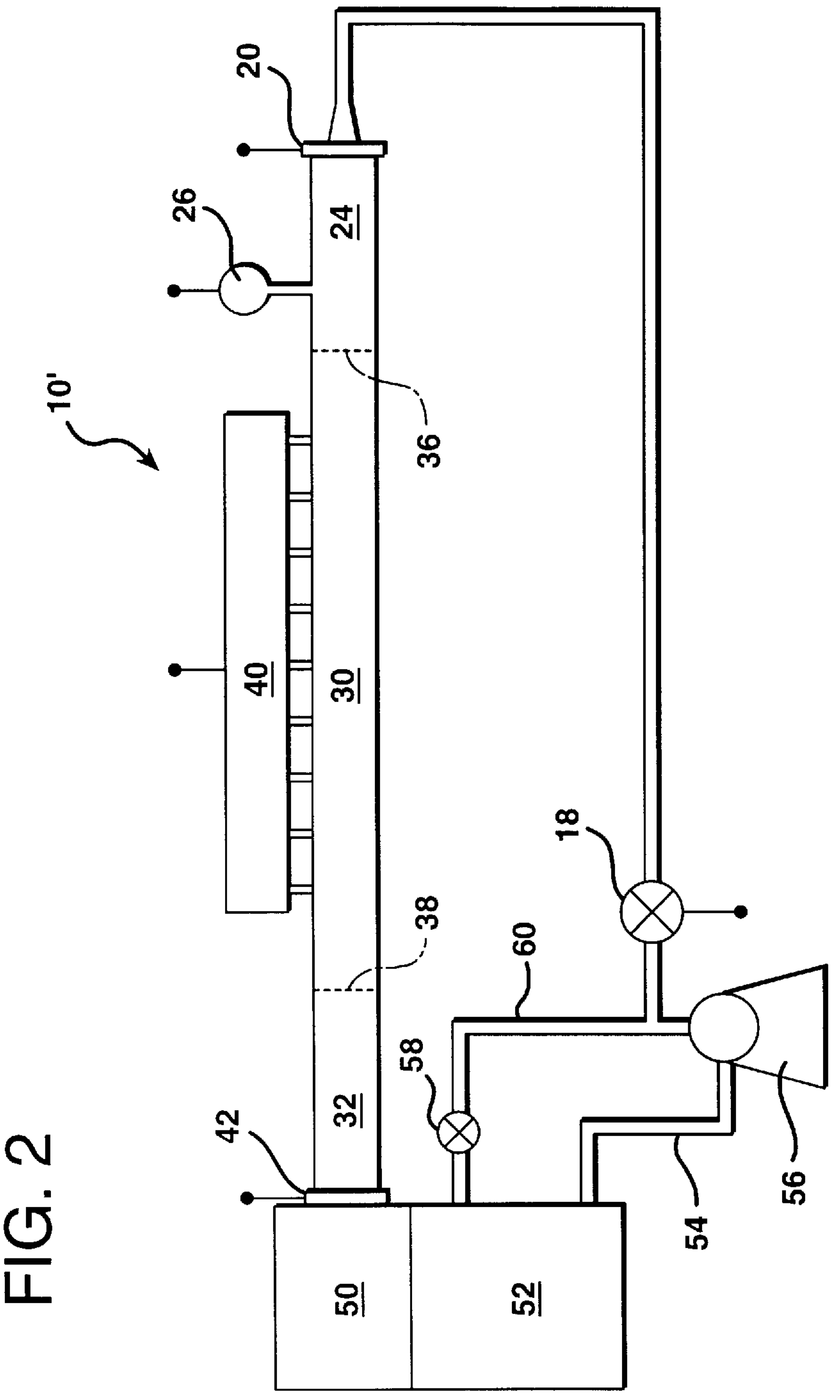
FIG. 2 is a schematic illustration of a liquid recycling multi-phase mixing system according to a second embodiment of the present invention.

The mixing system 10' illustrated in FIG. 2, where like elements are referenced by like reference numerals, provides for recycling of a liquid phase by passing the mixed fluid flow through a gas/liquid phase separator 50 and recycling the separated liquid phase after purification. A preferable phase separator is disclosed in U.S. Pat. No. 5,232,475, the disclosure of which is incorporated herein by reference. Initially, a liquid is pumped from a fluid header 52, through liquid conduit 54 and pump 56. As described above, the liquid passes through first flow rate controller 18 and film height controller 20 to form an inlet liquid flow in the first pipe section 24. A gas containing a contaminant is introduced from the non-atmospheric gas source 26 and a stationary hydraulic jump is formed in the second pipe section 30 as described in the FIG. 1 embodiment. The inlet liquid flow contains a contaminant absorbent component or a contaminant reaction component which removes the contaminant from the gas phase in the second pipe section 30. A mixed fluid passing from the third pipe section 32 and through the back pressure regulator flows through the phase separator 50 wherein the liquid phase is separated from the gas phase. The contaminant removed from the gas phase is subsequently removed from the liquid phase through settlement, or other purification means, and the liquid phase is recycled through valve 58 and conduit 60 to join the liquid flow upstream from the first flow rate controller 18.

It is contemplated by the present invention that, in the event the gas phase is used to remove a contaminant from the liquid phase, the phase separator 50 may be utilized to provide a recycled gas phase, as opposed to a recycled liquid phase, by passing the separated gas phase through a filter and/or a dryer prior to reintroducing the gas phase into the first pipe section 24. It is further contemplated by the present invention that fluid recycling technique of the FIG. 2 system may be provided in any of the stationary hydraulic jump mixing systems described herein by providing a phase separator, fluid purifying devices, and fluid directing conduits arranged to redirect a purified phase to the first pipe section 24.

It is contemplated by the present invention that a contaminant, as used in the specification and claims, is defined as any fluid component which is targeted for manipulation within, or removal from, one of the fluid phases introduced into the first pipe section 24. The contaminant may be a solid, liquid, or gas component of either of the fluids introduced into the first pipe section 24.

Figure 3:
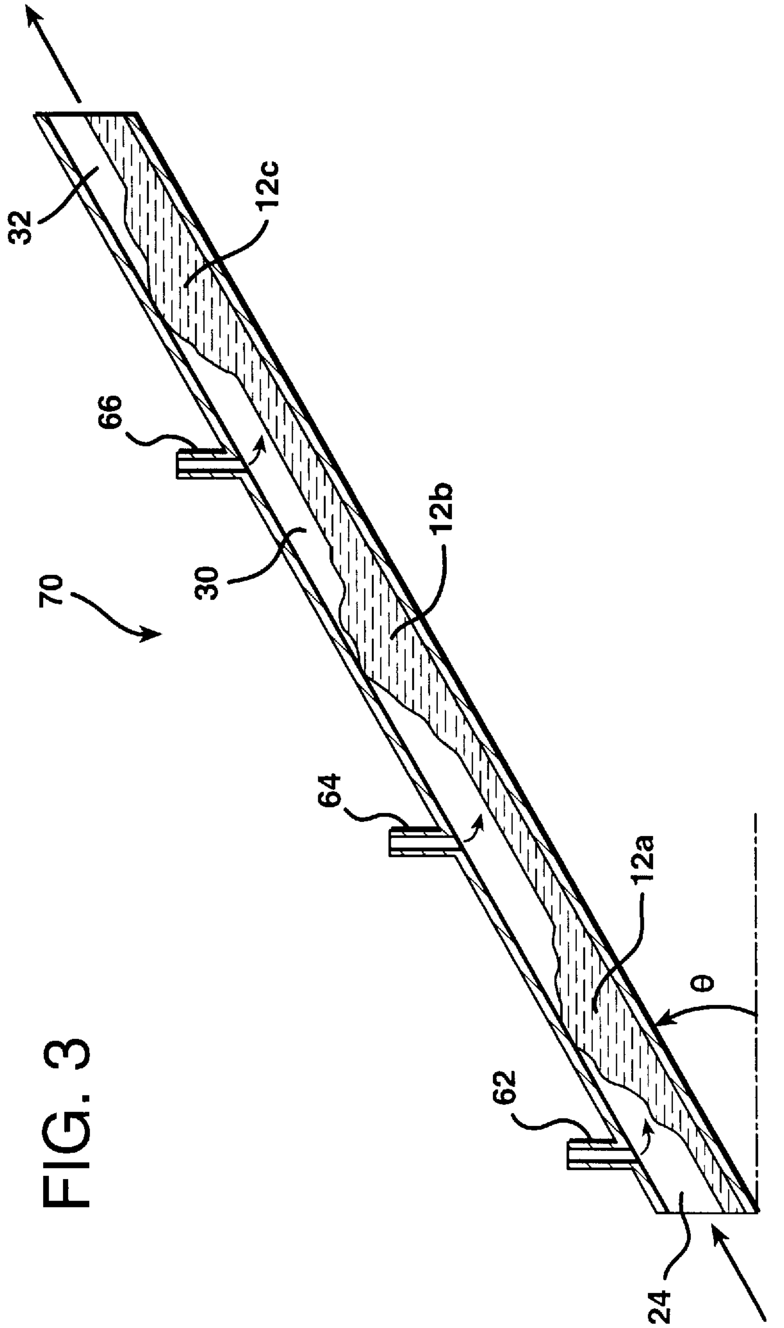
FIG. 3 is an illustration of an inclined multiple stationary hydraulic jump arrangement according to the present invention.

A plurality of stationary hydraulic jumps 12*a*, 12*b*, 12*c* may be formed in a stationary hydraulic jump mixing system by inclining a pipe section 70, as illustrated in FIG. 3. The pipe section 70 is inclined with respect to the flow direction of the inlet liquid at an angle θ of approximately three degrees. Gas sources are coupled to gas inlets 62, 64, 66 between the stationary hydraulic jumps 12*a*, 12*b*, 12*c* to facilitate formation of the jumps 12*a*, 12*b*, 12*c*. It is contemplated by the present invention that gas inlets 64 and 66 may be eliminated from the pipe section 70 or may be supplied with different gas phase components than inlet 62. In this manner an increased variety of mixtures may be produced as compared to single gas inlet embodiments.

In order to properly control the position of the plurality of jumps 12*a*, 12*b*, 12*c* within the pipe section 70, a controller must be provided which responds to a pressure distribution sensed within the pipe section 70 and controls back pressure applied to the jumps 12*a*, 12*b*, 12*c* to maintain a preferred pressure distribution. A preferred pressure distribution includes relatively high pressure regions located substantially symmetrically with respect to a midpoint of a plurality of jump portions in the monitoring section and relatively low pressure regions in a remainder of the monitoring section.

It is contemplated by the present invention that any of the mixing systems described herein may be modified to incorporate an inclined pipe section so as to create a plurality of stationary hydraulic jumps, as illustrated in FIG. 3. It is also contemplated by the present invention that a plurality of jumps may be formed in a horizontal pipe section if film height controllers and gas inlet ports are provided between successive jumps.

Figure 4:
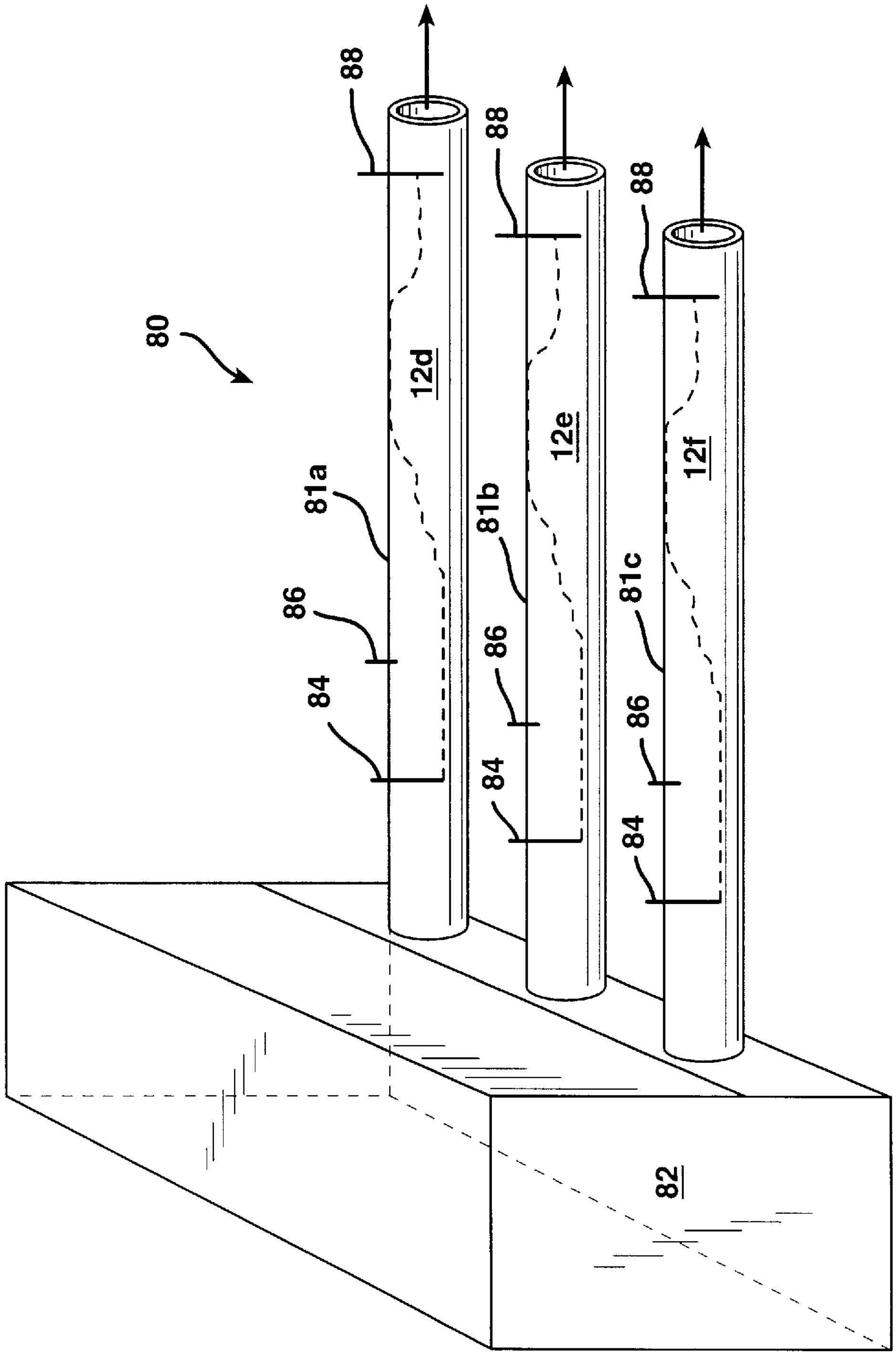
FIG. 4 is an illustration of a parallel-type multiple stationary hydraulic jump arrangement according to the present invention.

FIG. 4 illustrates a mixing system 80 including a plurality of pipes 81*a*, 81*b*, 81*c* each accommodating a stationary hydraulic jump 12*d*, 12*e*, 12*f*. Each pipe 81*a*, 81*b*, 81*c* is coupled to a common fluid header 82. The header 82 supplies a liquid flow which is metered by liquid film height control gates 84. Gas inlets 86 provide a gas phase to be mixed with the liquid in the jumps 12*d*, 12*e*, 12*f*. Back pressure regulators 88 facilitate creation and control of the stationary hydraulic jumps 12*d*, 12*e*, 12*f* as described above.

It is contemplated by the present invention that any of the stationary hydraulic jump mixing systems described herein may be modified to incorporate a plurality of stationary hydraulic jump pipe sections coupled to a common fluid source, as illustrated in FIG. 4.

Figure 5:
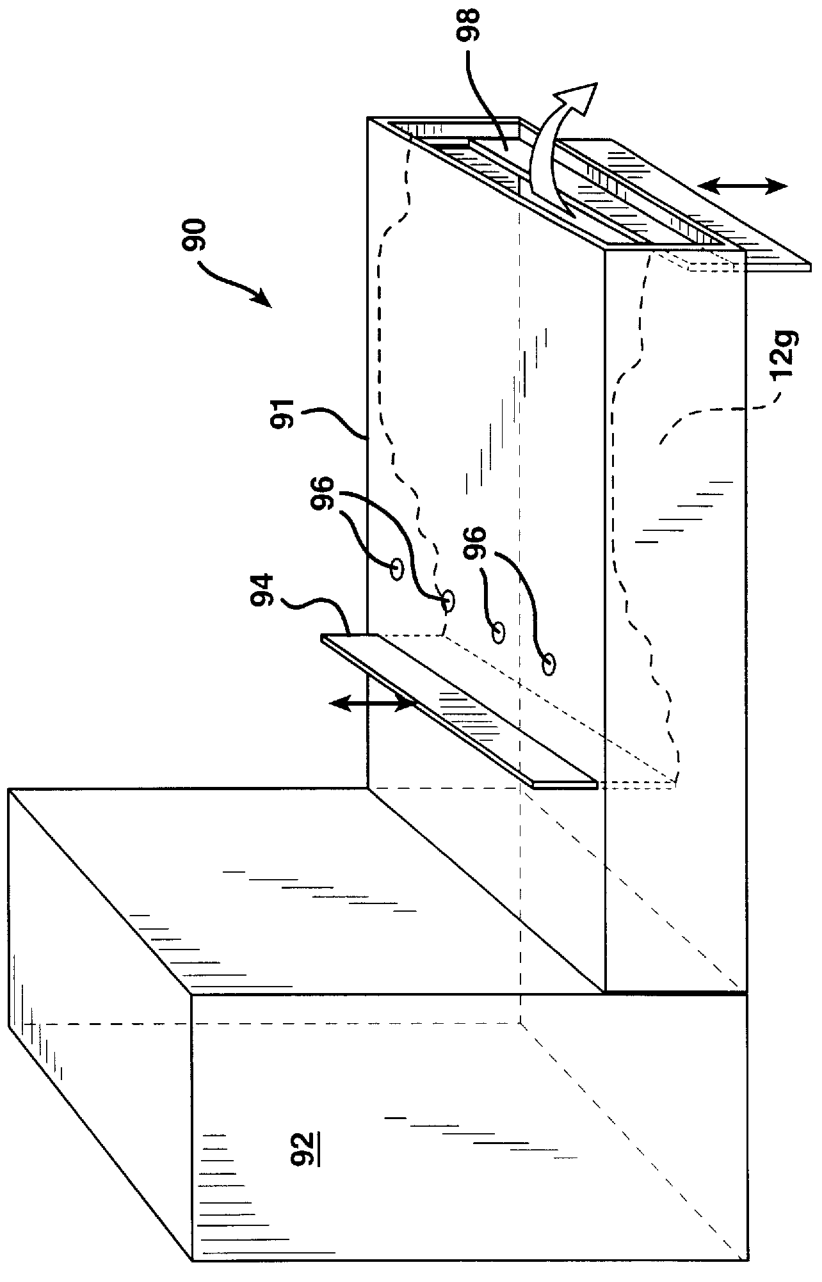
FIG. 5 is an illustration of a channel-type mixing system according to the present invention.

FIG. 5 illustrates a stationary hydraulic jump mixing system 90 wherein a rectangular shaped flow channel 91 accommodates a stationary jump 12*g*. The channel 91 is coupled to a fluid header 92. The header 92 supplies a liquid flow which is metered by a liquid film height control gate 94. A plurality of gas inlets 96 provide a gas phase to be mixed with the liquid in the jump 12*g*, and back pressure regulator 98 facilitates creation and control of the stationary hydraulic jump 12*g*.

It is contemplated by the present invention that a gas inlet exposed to air or the ambient may be used in place of a non-atmospheric gas source utilized in any of embodiments described herein. It is further contemplated by the present invention that, in any of the stationary hydraulic jump mixing systems described herein, a rectangular shaped flow channel may be utilized as any or all of the pipe sections within the mixing system.

It is contemplated by the present invention that the liquid flow 14 and the gas flow 28 can be any of a variety of combinations of fluid flows. For example, any chemical reaction involving a gas phase and a liquid phase reactant can be enhanced by combining the gas and liquid phases in the mixing system of the present invention. The gas flow 28 may be an effluent and the liquid flow 14 may comprise, for example, sodium hydroxide or calcium hydroxide for removing carbon dioxide from the gas through absorption during mixing, i.e., mass transfer. Volatile organic compounds present in the liquid flow 14, for example vinyl chloride, may be stripped from the liquid by mixing the liquid with a carrier gas, such as carbon dioxide, in the stationary hydraulic jump. Oxygen enrichment of water can be achieved by mixing an oxygen-containing gas with the water. Deoxygenation of water can be achieved by mixing an inlet flow of the water with carbon dioxide. A coal or oil/coal slurry may be mixed with air or oxygen to create an oxygen enriched combustible material. Fuels comprising mixed solid, liquid, and gaseous components may be created in the mixing system. A gas carrying a cement powder may be mixed with water to create a water/cement slurry. One of the fluid phases can be introduced to treat the other of the fluid phases through mass transfer, chemical reaction, biological activity, or otherwise.

Having described the invention in detail and by reference to preferred embodiments thereof, it will be apparent that modifications and variations are possible without departing from the scope of the invention defined in the appended claims.

What is claimed is:

1. A method of mixing materials comprising the steps of:

providing a first inlet flow of a first fluid in a first pipe section;

providing a second inlet flow of a non-atmospheric second fluid in said first pipe section;

creating at least one stationary hydraulic jump in a second pipe section in communication with said first pipe section;

mixing said first fluid and said second fluid in said at least one stationary hydraulic jump; and providing a mixed fluid flow in a third pipe section.

2. A method of mixing materials as claimed in claim 1 wherein said first fluid comprises a liquid and said second fluid comprises a gas.

3. A method of mixing materials as claimed in claim 1 further comprising the steps of:

monitoring pressure values at a plurality of points along a monitoring pipe section; and controlling the at least one stationary hydraulic jump in response to the monitored pressure values.

4. A method of mixing materials as claimed in claim 3 wherein said controlling step comprises:

maintaining constant a back pressure applied to said mixed fluid flow when said monitoring step indicates a first pressure distribution along said monitoring section; and altering said back pressure when said monitoring step indicates a second pressure distribution different than said first pressure distribution along said monitoring section.

5. A method of mixing materials as claimed in claim 3 wherein said control ling step comprises:

maintaining constant a flow rate of said first fluid, a flow rate of said second fluid, and a back pressure applied to said mixed fluid flow, when said monitoring step indicates a first pressure distribution along said monitoring section;

altering at least one of said first fluid flow rate, said second fluid flow rate, and said back pressure when said monitoring step indicates a second pressure distribution different than said first pressure distribution along said monitoring section.

6. A method of mixing materials as claimed in claim 4 wherein a single jump is created and said first pressure distribution includes a stationary relatively high pressure region in a jump portion of the monitoring section and a relatively low pressure region in a remaining portion of the monitoring section, and wherein said second pressure distribution includes a relatively high pressure region substantially removed from the jump portion of the monitoring section and a relatively low pressure region in a remaining portion of the monitoring section.

7. A method of mixing materials as claimed in claim 4 wherein a plurality of jumps are created and said first pressure distribution includes relatively high pressure regions located substantially symmetrically with respect to a midpoint of a plurality of jump portions of the monitoring section and relatively low pressure regions in a remainder of the monitoring section, and wherein said second pressure distribution includes relatively high pressure regions substantially removed from said substantially symmetrical locations and relatively low pressure regions in a remainder of the monitoring section.

8. A method of mixing materials as claimed in claim 3 wherein said controlling step comprises controlling one of a first fluid flow rate, a second fluid flow rate, and a back pressure applied to said mixed fluid flow.

9. A method of mixing materials as claimed in claim 3 wherein said controlling step comprises controlling the position of the at least one stationary hydraulic jump in said monitoring pipe section.

10. A method of mixing materials as claimed in claim 1 wherein said creating step comprises:

selecting a film height and a flow rate of said first fluid;

selecting a flow rate of said second fluid; and applying a back pressure to said mixed fluid flow.

11. A method of mixing materials as claimed in claim 1 wherein said creating step comprises:

selecting a desired mixing intensity; and selecting a film height and a flow velocity of said first fluid corresponding to the selected mixing intensity.

12. A method of mixing materials as claimed in claim 11 wherein said selected mixing intensity is characterized by a Froude number between about 1 and about 14.

13. A method of mixing materials as claimed in claim 11 wherein said selected mixing intensity is characterized by a Froude number between about 4 and about 12.

14. A method of mixing materials as claimed in claim 1 wherein said first pipe section is at a first pressure, said second fluid is introduced into said second inlet at a second pressure, and said second pressure is greater than an atmospheric pressure.

15. A method of mixing materials as claimed in claim 1 wherein said first pipe section is at a first pressure, said second fluid is introduced into said second inlet at a second pressure, and said second pressure is less than an atmospheric pressure.

16. A method of mixing materials as claimed in claim 1 wherein said first fluid and said second fluid are at substantially the same pressure.

17. A method of mixing materials as claimed in claim 1 wherein one of said first and second fluids contains a contaminant and the other of said first and second fluids contains a contaminant removal component.

18. A method of mixing materials as claimed in claim 1 wherein one of said first and second fluids contains a component which dissolves in a component of the other of said first and second fluids after said mixing step.

19. A method of mixing materials as claimed in claim 1 wherein one of said first and second fluids contains a component which is suspended in the other of said first and second fluids after said mixing step.

20. A method of mixing materials as claimed in claim 1 wherein one of said first and second fluids comprises a contaminant and the other of said first and second fluids comprises an agent for treating said contaminant.

21. A method of mixing materials as claimed in claim 1 wherein one of said first and second fluids contains a component which reacts with a component of the other of said first and second fluids.

22. A method of mixing materials as claimed in claim 1 wherein said first fluid comprises a liquid and a substantial portion of particulate matter, and wherein said second fluid comprises a gas.

23. A method of mixing materials as claimed in claim 1 wherein said first fluid comprises a liquid and a substantial portion of a gas, and wherein said second fluid comprises a gas.

24. A method of mixing materials as claimed in claim 1 wherein said first fluid comprises a liquid, and wherein said second fluid comprises a gas and a substantial portion of particulate matter.

25. A method of mixing materials as claimed in claim 1 wherein said first fluid comprises a liquid, and wherein said second fluid comprises a gas mixed with a substantial portion of a liquid.

26. A method of mixing materials as claimed in claim 1 wherein at least one of said first and second fluids comprises a three phase mixture of components.

27. A method of mixing materials as claimed in claim 1 further comprising the step of separating at least two components of said mixed fluid flow.

28. A method of mixing materials as claimed in claim 1 further comprising the steps of:

monitoring at least one pressure value corresponding to at least one point along a monitoring pipe section; and altering said back pressure when said monitoring step indicates movement of the hydraulic jump.

29. An apparatus for mixing materials comprising:

a first pipe section including a first fluid inlet, a second non-atmospheric fluid inlet, and a first fluid film height controller;

a second stationary hydraulic jump pipe section in communication with said first pipe section; and a third pipe section in communication with said second pipe section and including a back pressure regulator.

30. An apparatus for mixing as claimed in claim 29 further comprising:

a pipe pressure distribution sensor adapted to sense the pressure distribution along a monitoring pipe section.

31. An apparatus for mixing as claimed in claim 30 further comprising a controller adapted to control the back pressure regulator in response to the sensed pressure distribution.

32. An apparatus for mixing as claimed in claim 30 further comprising a controller adapted to control the back pressure regulator, a first fluid flow rate controller, and a second fluid flow rate controller in response to a sensed pressure distribution.

33. An apparatus for mixing as claimed in claim 29 wherein said second pipe section is inclined with respect to a flow direction of said first fluid and said second fluid inlet comprises a plurality of fluid inlet ports located so as to be positioned prior to a first stationary hydraulic jump and between successive stationary hydraulic jumps in said second pipe section.

34. An apparatus for mixing as claimed in claim 29 wherein said second pipe section includes a plurality of pipes each including a section carrying at least one stationary hydraulic jump, and wherein said plurality of pipes are in communication with a common fluid header.

35. A method of mixing materials comprising the steps of:

providing a first inlet flow of a first fluid in a first pipe section;

providing a second inlet flow of a second fluid in said first pipe section;

creating at least one stationary hydraulic jump in a second pipe section in communication with said first pipe section;

mixing said first fluid and said second fluid in said at least one stationary hydraulic jump;

providing a mixed fluid flow in a third pipe section;

monitoring pressure values within a monitoring pipe section at a plurality of points along said monitoring pipe section; and controlling the at least one stationary hydraulic jump in response to the monitored pressure values.

* * * * *